United States Patent [19]

Heh

[11] Patent Number: 4,858,521

[45] Date of Patent: Aug. 22, 1989

[54] RADON GAS HOME/BUILDING MITIGATION APPARATUS AND METHOD

[76] Inventor: Robert W. Heh, 830 Mifflin Rd., Pittsburgh, Pa. 15207

[21] Appl. No.: 222,497

[22] Filed: Jul. 21, 1988

[51] Int. Cl.$^4$ .............................................. F24F 11/00
[52] U.S. Cl. .................................. 98/42.05; 52/169.5; 98/42.02; 98/42.06; 175/62
[58] Field of Search ............................. 52/169.1, 169.5; 98/33.1, 42.02, 42.04, 42.06, 42.05; 175/62; 405/242, 251, 253, 255

[56] References Cited

U.S. PATENT DOCUMENTS

| | | | |
|---|---|---|---|
| 1,894,446 | 11/1933 | McKenny | 175/62 X |
| 2,469,027 | 1/1961 | Figge | 98/31 X |
| 2,517,494 | 8/1950 | Kiss et al. | 175/62 X |
| 3,017,722 | 1/1962 | Smith | 52/169.5 |
| 3,791,443 | 2/1974 | Burt et al. | 52/169.5 X |
| 4,026,371 | 5/1977 | Takada et al. | 175/62 |
| 4,542,796 | 9/1985 | Delbarre | 175/62 X |
| 4,620,398 | 11/1986 | Wallin | 52/169.1 |
| 4,760,674 | 8/1988 | Brand et al. | 52/169.5 |
| 4,773,309 | 9/1988 | Walters | 98/31.6 |

OTHER PUBLICATIONS

"Radon Reduction Techniques for Detached Houses", *Technical Guidance*, EPA/625/5-86/019, U.S. Environmental Protection Agency, Jun. 1986.

*Primary Examiner*—Harold Joyce
*Attorney, Agent, or Firm*—William J. Ruano

[57] ABSTRACT

A radon gas home/building mitigation method that reduces a home's/building's high radon level to a value that is within the recommended "safe" range. The mitigation method works by removing radon gas from the soil that is in contact with points of entry in the home/building, namely the homes slab, footer and below ground block that is connected to the footer. The method uses a hydraulic press/impactor to drive sections of threaded and perforated pipe under a home's/building's entire slab and footer. The pipe is made of sufficient length by threading and bonding numerous such pipes together. During the hydraulic press operation, each section of pipe has a tipped bit connected to its lead length and an impact sleeve connected to and disconnected from each end that is subjected to contact with the hydraulic press. After all the pipe sections are in place, each of the sections are interconnected at one end to each other and several vents. Each of the sections are interconnected at their remaining ends to each other and an automatic timer controlled fan(s) or wind turbine(s). The fan(s) create a vacuum in the pipe and cause the radon gas in the soil to be drawn into the pipe through its perforations and exhausted to the outside air where it quickly dissipates.

4 Claims, 2 Drawing Sheets

RADON GAS HOME/BUILDING MITIGATION APPARATUS AND METHOD

This invention relates to a very reliable, relatively low cost radon gas home mitigation apparatus and method.

BACKGROUND OF THE INVENTION

Excessive amounts of radon gas in domestic homes/buildings can be a health hazard to its occupants. Radioactive decay products from radon gas have been linked to lung cancer. It is unknown today how many homes/buildings have excessive radon gas levels. However, numerous articles published in a wide variety of both technical and non-technical magazines and newspapers over the past few years indicate that a large number of homes may have radon gas levels above the recommended "safe" guideline. A relatively low cost method is presented to reduce the radon level in homes. The method is such that it can be utilized on any existing home/building regardless of the home's building's architectural design or the geological or topographical characteristics upon which it is situated. The method will not aesthetically affect, in any way, the home's/builidng's interior during or after implementation or alter the sructural integrity of the home/building. In addition, the method does not permit appreciable heat loss to the home/building during the heating season and thus eliminates a drawback to contentional remedial measures used at present.

SUMMARY OF THE INVENTION

The nature of the method increases probability of reducing the radon level to within recommended "safe" levels in homes/building that it is implemented. A hydraulic press is used to drive perforated plastic pipes which traverse the length and width of the house/building at a depth just below the footer. This series of pipes is interconnected to several above ground vent holes on one end and to an above ground exhaust fan on the opposite side. When in operation, the exhaust fan will create a vacuum in the pipes. This vacuum will draw radon gas located in the surrounding soil through the pipes and into the atmosphere. Since the pipes will be drawing soil radon gas away from all its points of entries into the home/building, namely the slab and hollow block/footer locations, the efficiency of the method can be improved by increasing the fan size until the desired result is achieved.

As stated above, the mitigation method is relatively low cost because the hydraulic press pushes the pipe under the house/building. The method does not required digging underneath the slab or footer and does not require drilling of the pipe paths through the concrete slab as required by some conventional methods.

DESCRIPTION OF THE PREFERRED EMBODIMENTS

Figure 1:
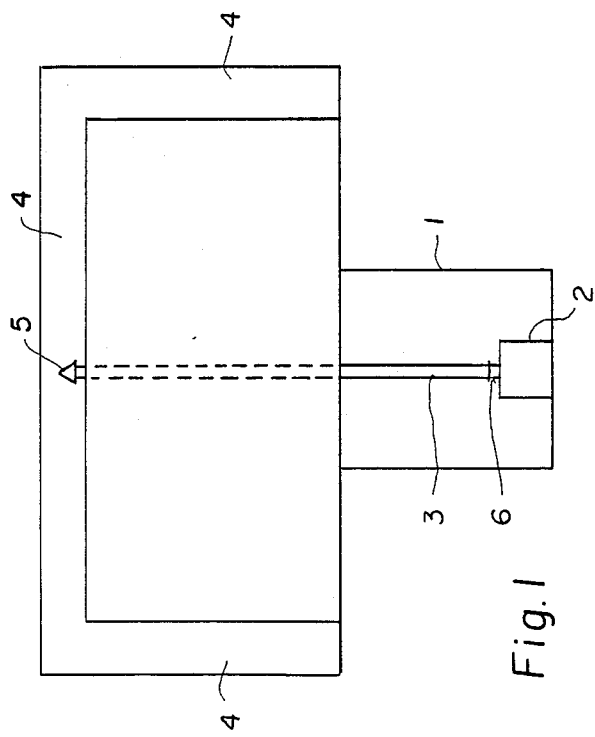
FIG. 1 shows a plan view of a home/buiding during pipe installation and FIGS. 1a and 1b are front and right side views thereof.
Figure 1A:
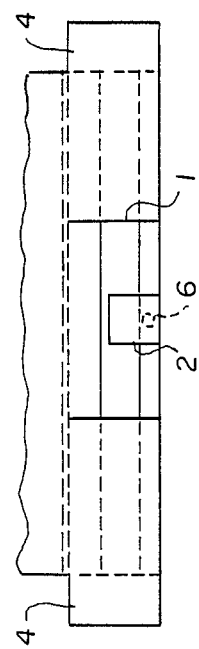
Figure 1B:
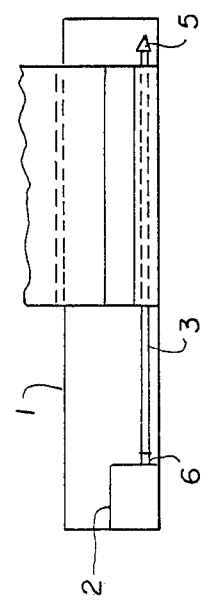

A focal point trench 1 (FIG. 1) is dug with a backhoe. The trench is of sufficient width to allow a hydraulic pipe press 2 and human operator to be placed in it. The trenches' length and depth are such that it will enable the press to achieve the impact necessary to drive interconnected lengths of threaded and perforated pipe 3 (FIG. 1) through the geological composition directly beneath the homes/buildings slab and footer. For homes/buildings built with a slab only construction, the depth would be such to allow the press to drive the pipe just under the slab.

Trenches 4(FIG. 1) are then dug the lengths of the other three sides of the home/building. The trenches are of sufficient width and depth so as to allow a human being to go to the bottom and remove the tipped bit 5 (FIG. 1) from the lead length of pipe after a respective section of pipe has been driven completely underneath the home/building.

After the hydraulic press is in place, the tipped bit that is composed of a hard material such as tungsten carbide or diamond will be attached to one end of a threaded and perforated pipe and an impact sleeve 6 (FIG. 1) will be attached to the other end. The diameter of the bit at its largest value will be greater than the outside diameter of the pipe to provide clearance between the pipe and the ground it is being driven through. The sleeve will be composed of a material that will not fracture or crack upon impact contact with the hydraulic press.

Figure 3:
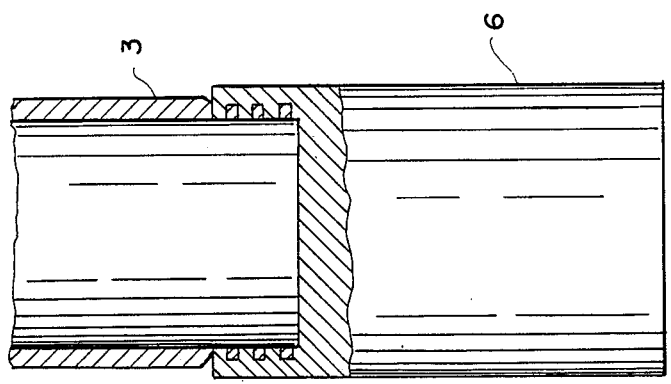
FIG. 3 is an enlarged cross-sectional view of the impact sleeve.
Figure 3A:
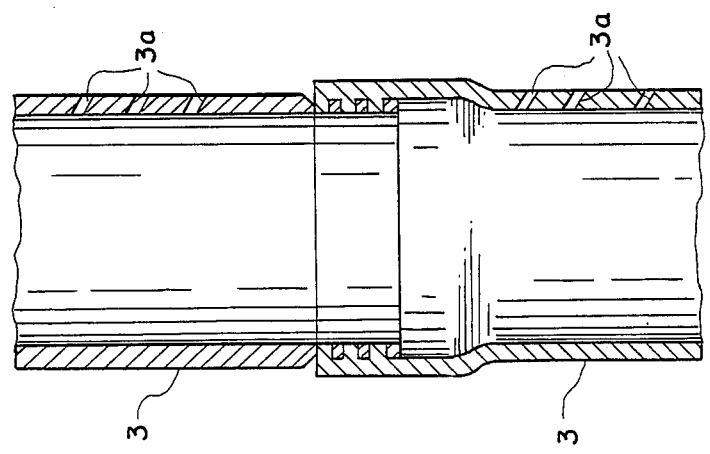
FIG. 3a, the threaded perforated pipe.
Figure 2:
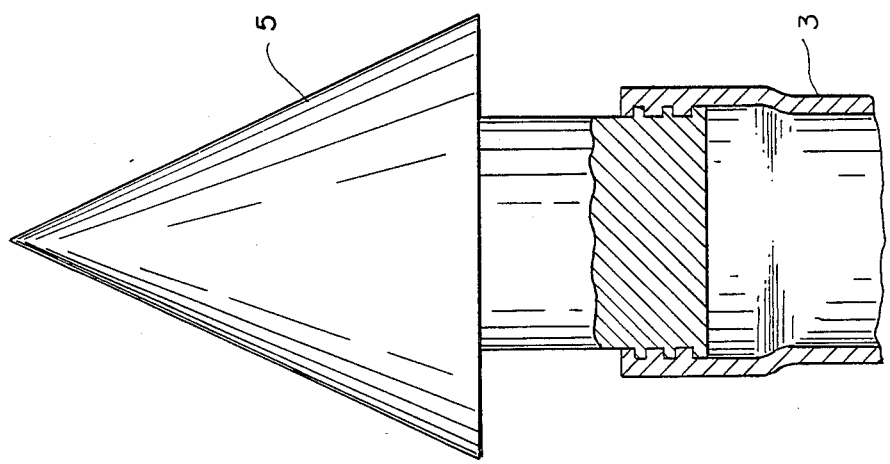
FIG. 2 is an enlarged cross-sectional view of the tipped bit and pipe shown in FIG. 1.

Once the bit and sleeve attachment are secure, the pipe is then aligned such that its perforated holes 3a (FIG. 3a) will not allow dirt and water to accumulate inside the pipe by extending in a direction opposite to that in which the pipes are forcibly driven. Positioning of the holes at the bottom portion of the pipes will minimize entry of dirt into the pipes over a long period of time. The pipe will be positioned at an angle that will allow it to be driven to the farmost desirable left or righthand location under the home. The hydraulic press is then turned on and the lead pipe is driven until only a reasonable length of pipe extends from the trench. The press's impact force is used whenever the ground resistance during the pipe driving operation is greater than the press force. Water or some other suitable lubricant will be used as needed.

When all the pipe sections have been driven, the press is turned off and the sleeve is removed from the lead pipe. A new length of threaded and perforated pipe is then attached to the lead pipe through use of the pipe's threads and a bonding material. The pipe threads will be designed to withstand the impact force of the hydraulic press. At the same time, the threads will be of a number such that when they are fully engaged, the pipe perforations will prohibit dirt and water accumulation inside the pipe.

The sleeve is now attached to this new length of pipe. The hydraulic press is again activated and the entire interconnected pipe length is driven through the ground. This process is repeated until the lead end is driven a reasonable amount through one of the side trenches. At that time, the tipped bit is removed from the lead end and the sleeve is removed from the opposite end.

After this, another length of pipe is used as the lead pipe in the next section. The tipped bit is attached to one end and the impact sleeve is attached to the other end. The pipe is aligned such that its perforations will not permit water and dirt from accumulating inside the pipe. Similarly, other sections of pipe are installed in such a way that the pipes fan out with respect to the adjacent previously driven pipe from the central trench at a single point.

Figure 4:
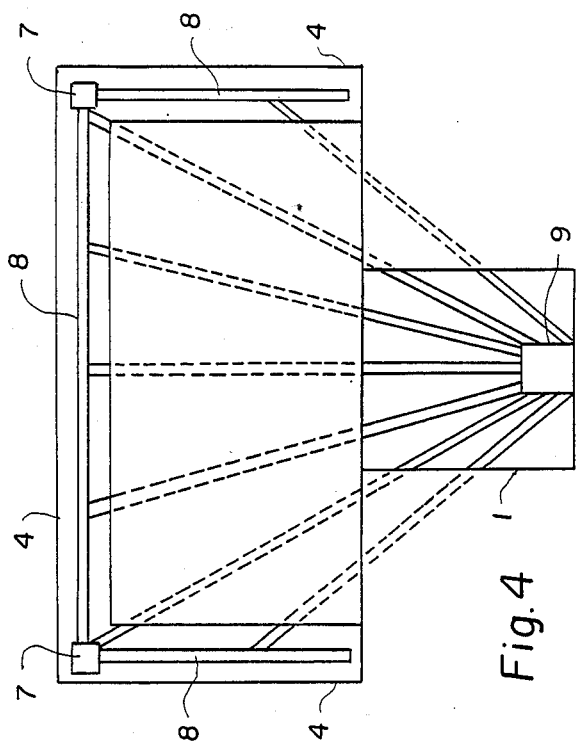
FIG. 4 is a plan view of the home/building after pipe and fan installation.
Figure 4A:
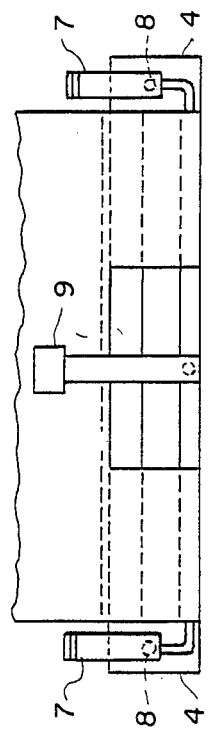
FIGS. 4a and 4b are front and right side views.
Figure 4B:
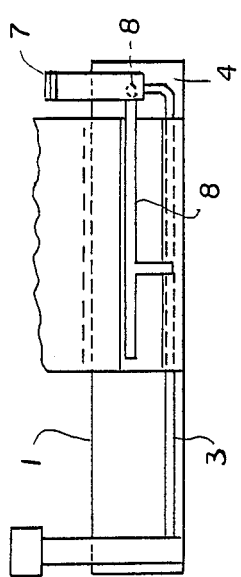

At this point, the hydraulic press is removed from the focal point trench. Above ground vents 7 (FIG. 4a) composed of solid pipe are placed in the trenches. A series of pipe junctions 8 (FIG. 4) and straight pieces will then be used to interconnect all the pipes together at their side trench and focal point trench. The location of these junctions and straight pieces relative to the bottom of the trench will be determined on an individual basis for each home/building. Also at the focal point trench, an automatic timer controlled exhaust fan(s) or wind turbine(s) 9 (FIG. 4b) is installed to force ventilation air through the pipes.

When in operation, the fan(s) will draw air from the above ground openings. The velocity of the air will result in a negative pressure or "vacuum" at the pipes perforations. This vacuum will draw soil gas and its radon gas component into the pipe. Once in the pipe, the radon gas will travel with the drawn air through the entire pipe section toward the fan. The fan will then exhaust the radon into the outside air where it will immediately dissipate into harmless concentrations.

By drawing the radon gas away from the soil that is in contact with its points of entry into the home/buiding, namely the slab and the footer any below ground block attached to the footer,the method is expected to reduce the homes/buildings radon level to within recommended "safe" limits. However, because of a wide variety of variables unique to each individual house/building, the smallest capacity fan(s) and the amount of time each day such a fan(s) will have to operate in order to achieve the desired effect will have to be found emperically for every home/building at which this method is implemented.

In the above description, if placing sectionsof pipe underneath the entire house/building is not desired due to cost or other reasons, then any one or two of the side trenches (items 4), would be eliminated. However, the eliminated trenches and pipe would have to be added if the home/building radon level was not reduced to a suitable level by continuous operation of the largest fan(s) possible.

Other modifications and alternatives to the above description include using friction connected pipe instead of threaded pipe, allowing the fans to blow into the pipes and using the vents to exhaust the radon and twist drilling the pipe throug the ground as opposed to impact/boring it through.

In addition, instead of digging the side trenches, a metal detector could be used to locate the tipped bit after a respective section of pipe has been driven under the house. A sufficient hole would then be dug to allow the removal of the tipped bit and the connection of a pipe elbow. Straight pipe would be connected to the elbow and extend to a height above ground level. In this way, each section of pipe would have its own independent vent.

Finally, for new home/building construction, the perforated pipe would not be driven into the ground by use of the hydraulic press. Instead, when the ground on which the home/building is to be constructed on has been completely dug out and leveled, a series of parallel trenches extending the length of the longest dimension of the home/building will be dug. The size of the trenches in terms of width and depth will be slightly larger than the size of the perforated pipe to be used. The distance between trenches will be determined for each home/building on an individual basis.

The sections of perforated pipe would then be placed in the trenches with the perforations positioned at the bottom portion of the pipe. Beyond this point, the mitigation method would be installed as described above for an existing home/building. After implementation of the radon mitigation method, the home/building would be erected using conventional construction techniques such as the slab type or footer and slab type construction.

While the above has illustrated and described several embodiments of the invention, it will be understood that these are by way of illustration only and that various changes and modifications may be contemplated in my invention and within the scope of the following claims:

I claim:

1. In a building supported on a rectangular foundation slab surrounded by trenches extending below and beyond a longitudinal side and two ends of said slab and beyond a portion of the other longitudinal side of said slab, a plurality of perforated pipes extending underneath said slab in fanned out relationship from a focal point in said trench portion of the other longitudinal side of said slab, a series of pipe junctions in a U-shape extending in said first mentioned trenches beyond a longitudinal side and two ends of said slab, which pipe junctions are connected to the extremities of said fanned out perforated pipes, an above-ground header connected to said pipe junctions at said focal point, and an exhaust fan connected to said pipes to force ventilation air through the pipes and cause a vacuum therein to enable removal of radon gas otherwise penetrating said building.

2. Apparatus as recited in claim 1 wherein said perforations to said perforated pipes extend angularly away from the direction toward said pipe junctions.

3. Apparatus as recited in claim 1 wherein said perforated pipes are connected to said pipe junctions at the corners of the surrounding trenches.

4. Apparatus as recited in claim 2 wherein said perforations are positioned on the bottom surface of said pipes.

* * * * *